United States Patent
Zhang et al.

(10) Patent No.: US 12,496,117 B2
(45) Date of Patent: Dec. 16, 2025

(54) METHOD AND DEVICE OF ADAPTIVE EMC-EMI RADIO FREQUENCY SIGNAL DATA PROCESSING

(71) Applicant: CARBON (SHENZHEN) MEDICAL DEVICE CO, LTD., Shenzhen (CN)

(72) Inventors: Shiping Zhang, Shenzhen (CN); Xiaowei Yang, Shenzhen (CN); Mingyu Feng, Shenzhen (CN); Menglin Wu, Shenzhen (CN)

(73) Assignee: CARBON (SHENZHEN) MEDICAL DEVICE CO, LTD., Shenzhen (CN)

( * ) Notice: Subject to any disclaimer, the term of this patent is extended or adjusted under 35 U.S.C. 154(b) by 798 days.

(21) Appl. No.: 17/885,587

(22) Filed: Aug. 11, 2022

(65) Prior Publication Data
US 2023/0049536 A1   Feb. 16, 2023

(30) Foreign Application Priority Data
Aug. 13, 2021   (CN) .......................... 202110930183.7

(51) Int. Cl.
*A61B 18/14*   (2006.01)
*A61B 18/00*   (2006.01)

(52) U.S. Cl.
CPC .... *A61B 18/14* (2013.01); *A61B 2018/00577* (2013.01); *A61B 2018/00589* (2013.01); *A61B 2018/00601* (2013.01); *A61B 2018/00642* (2013.01); *A61B 2018/00702* (2013.01); *A61B 2018/00714* (2013.01)

(58) Field of Classification Search
None
See application file for complete search history.

(56) References Cited

U.S. PATENT DOCUMENTS

| | | | |
|---|---|---|---|
| 2011/0112526 A1* | 5/2011 | Fritz .................. | A61B 18/1206 606/34 |
| 2021/0068896 A1* | 3/2021 | Eckert ................ | G01R 29/0892 |
| 2021/0298811 A1* | 9/2021 | Dijkstra ................ | A61B 18/16 |

* cited by examiner

*Primary Examiner* — Sean W Collins
*Assistant Examiner* — Nora W Rhodes
(74) *Attorney, Agent, or Firm* — Bayramoglu Law Offices LLC

(57) ABSTRACT

A method and a device of adaptive EMC-EMI radio frequency signal data processing are provided. The method includes: performing segmentation and preprocessing in response to a radio frequency signal; performing Hilbert-Huang transform on signals after segmentation; calculating EMC power, EMI radio frequency energy and mode, and a radio frequency signal-to-noise mode, and comparing the EMC power, the EMI radio frequency energy and mode, and the radio frequency signal-to-noise mode with corresponding thresholds; and adaptively adjusting energy parameters of a radio frequency ablation device, or prompting a user to adjust the energy parameters of the radio frequency ablation device. Instantaneous and dynamic radio frequency plasma is qualitatively and quantitatively detected and classified according to a signal-to-noise mode and pattern recognition of radio frequency emission, and an actual state of the knife head is perceived, to performs adaptive control or prompt the user to perform an adjustment operation.

14 Claims, 2 Drawing Sheets

Outputted voltage waveform

Outputted voltage waveform adjusted based on EMC-EMI

METHOD AND DEVICE OF ADAPTIVE EMC-EMI RADIO FREQUENCY SIGNAL DATA PROCESSING

CROSS REFERENCE TO THE RELATED APPLICATIONS

This application is based upon and claims priority to Chinese Patent Application No. 202110930183.7, filed on Aug. 13, 2021, the entire contents of which are incorporated herein by reference.

TECHNICAL FIELD

The present invention relates to the field of electrosurgery, and specifically, to an adaptive radio frequency ablation device based on EMC-EMI radio frequency signal-to-noise level measurement.

BACKGROUND

Coblation technology is a minimally invasive cryogenic technology for effectively dissecting and removing tissues, which is suitable for otolaryngology operations such as tonsillectomy, adenoidectomy, hypertrophic turbinate reduction, laryngeal polypectomy and lesion site reduction, soft palate, snoring, and sinus surgery. Compared with most of the thermally driven radio frequency surgical products, the coblation technology is more accurate. By using the coblation technology, a controllable and stable plasma field can be generated and tissues can be accurately removed at a relatively low temperature, thereby minimizing thermal damage to surrounding soft tissues.

Because an ablation process involves many disciplines such as biology, heat transfer, mechanics, and clinical medicine, it is necessary to accurately control an ablation range, minimize unnecessary damage, and ensure that focus cells are destroyed to a maximum extent without damaging normal tissue cells.

Currently, most of radio frequency ablation devices track, estimate, and evaluate radio frequency power and energy transmission mainly by measuring RMS current, which is easy to cause energy loss and electromagnetic noise in radio frequency energy transmission of coblation. There is no method for accurately tracking or analyzing a radio frequency ablation device signal in the existing technology.

In addition, considering that the minimally invasive operation technology has a relatively high technical threshold and long learning curve, it is difficult for young doctors to have enough knowledge and experience, and it is particularly difficult to train the young doctors and guide them at an initial stage of work. The existing training methods usually rely on knowledge point explanation, video introduction, and the like, through which long-term operation experience of doctors cannot be accurately expressed, and the existing training methods cannot help beginners understand an operation step, identify an operation environment and control a radio frequency parameter well. Therefore, there is an urgent need for a signal processing device in clinical practice, which can carry out auxiliary signal analysis and provide matching operation parameters for doctors' reference in clinical practice and simulation training.

SUMMARY

Aiming at a problem that the current radio frequency ablation device cannot prepare for signal tracking and adaptive feedback, the present invention provides a method and device of adaptive EMC-EMI radio frequency signal data processing, so that instantaneous and dynamic radio frequency plasma is qualitatively and quantitatively detected and classified according to a signal-to-noise mode and pattern recognition of radio frequency emission, and an actual state of the knife head is perceived, to perform adaptive control or prompt the user to perform an adjustment operation.

The technical solutions of the present invention are as follows.

The present invention provides a method of adaptive EMC-EMI radio frequency signal data processing. The method includes the following steps:

S1. responding to, by a processor, a radio frequency signal of a radio frequency ablation device acquired by an EMC-EMI sensor;

S2. segmenting, by the processor, the radio frequency signal, where a window stage after segmentation includes one or more stages of idling, energy generation, ablation and cutting, and coagulation and heat control, and preprocessing signals of each window stage after segmentation respectively;

S3. performing Hilbert-Huang transform on signals of the two window stages of ablation and cutting, and coagulation and heat control after segmentation, to obtain time-frequency characteristics of electromagnetic signals of the corresponding window stages;

S4. calculating EMC power, EMI radio frequency energy and mode, and a radio frequency signal-to-noise mode according to the time-frequency characteristics of electromagnetic signals; and comparing the EMC power, the EMI radio frequency energy and mode, and the radio frequency signal-to-noise mode with corresponding thresholds respectively, to obtain knife head states in the window stages of ablation and cutting, and coagulation and heat control, including touching metal short circuit, overheating and overload; and S5. adjusting, by the processor, energy parameters of the radio frequency ablation device according to the knife head states obtained in step S4, or prompting a user to adjust the energy parameters of the radio frequency ablation device.

Further, the preprocessing in step S2 includes:

step 2.1. removing high-frequency electrical noise by low-pass filtering;

step 2.2. eliminating signal drift by high-pass filtering; and step 2.3. removing a non-physiological pseudo-signal by band-pass filtering.

Further, the Hilbert-Huang transform in step S3 specifically includes the following steps:

S3.1. performing empirical mode decomposition (EMD) on the signals of the window stages of ablation and cutting, and coagulation and heat control respectively, to obtain limited intrinsic mode function (IMF) component expressions of a corresponding signal s(t);

$s(t)=\sum_{i=1}^{k} c_i(t)+r_k(t)$, where i represents a number of an IMF component order, k represents the IMF component order, $c_i(t)$ is an $i^{th}$ order of IMF component, and $r_k(t)$ is an $i^{th}$ order of IMF residual component;

S3.2. performing Hilbert transform on each order of IMF component $c_i(t)$, to obtain a Hilbert transform expression of the IMF component $y_i(t)$;

$$y_i(t) = \frac{p}{\pi} \int_{-\infty}^{+\infty} \frac{c_i(t)}{t-\tau} d\tau$$

where p is a Cauchy principal value, and τ represents an amount of change per unit time;

S3.3. obtaining an instantaneous phase $\varphi_i(t)$ and an instantaneous frequency $\omega_i(t)$ of each order of IMF component by using the following formula;

$$\varphi_i(t) = \arctan(y_i(t)/c_i(t))$$

$$\omega_i(t) = \frac{d\varphi_i(t)}{dt};$$

S3.4. comparing and screening a value of each frequency point in the instantaneous frequency $\omega_i(t)$ with an instantaneous frequency threshold λ, if the instantaneous frequency $|\omega_i| > \lambda$, keeping the IMFi component unchanged, otherwise making the IMFi component be 0;

S3.5. distinguishing between a square wave and a harmonic wave according to the value of each frequency point, and recording a spectrum and spectrum characteristics of the IMFi component; and S3.6. reconstructing a signal s'(t) by using a screened IMF component in step S3.4, to obtain a time-frequency characteristic of an electromagnetic signal of the reconstructed signal.

Further, the obtaining limited intrinsic mode function (IMF) components of a signal s(t) in step S3.1 specifically includes the following steps:

S3.1.1. segmenting an original signal s(t) according to a preset processing window, and taking a maximum value and a minimum value of the original signal s(t) for any processing window;

S3.1.2. interpolating the maximum value and the minimum value of the original signal s(t) in the processing window by using spline interpolation, and fitting upper and lower envelopes;

S3.1.3. calculating a mean $m_1(t)$ of the upper and lower envelopes, and obtaining a difference $h_1(t)$ between the original signal s(t) and the mean $m_1(t)$; $h_1(t)=s(t)-m_1(t)$;

S3.1.4. calculating the first IMF component $c_i(t)$ and a residual signal $r_1(t)$;

$c_1(t)=h_1(t)$, $r_1(t)=s(t)-c_1(t)$;

S3.1.5. determining whether the residual signal $r_1(t)$ meets an empirical mode decomposition (EMD) condition, that is, whether $r_1(t)$ is a monotone function, if the residual signal $r_1(t)$ meets the condition, stopping processing, and marking k=1;

otherwise, repeating steps S3.1.1 to S3.1.4 for k times by using $h_1(t)$ as the original signal;

$h_k(t)=h_{(k-1)}(t)-m_k(t)$, $c_k(t)=h_k(t)$, $r_k(t)=h_{(k-1)}(t)-c_k(t)$;

completing smooth decomposition processing, and recording k until the residual signal $r_k(t)$ is the monotone function; and S3.1.6. converting s(t) into k intrinsic mode function component expressions:

$s(t)=\Sigma_{i=1}^{k} c_i(t)+r_k(t)$, where $c_i(t)$ is an $i^{th}$ IMF component of the signal.

Further, the instantaneous frequency threshold A in step S3.4 ranges from 0.0094 to 0.01.

Further, the spectrum characteristics in step S3.5 include: a frequency characteristic peak value, a peak-to-peak frequency-to-amplitude ratio, and a main frequency component.

Further, the energy parameters of the radio frequency ablation device in step S1 include: voltage, current, impedance, temperature, humidity, and contact force.

A device for the method of adaptive EMC-EMI radio frequency signal data processing. The device includes:

a radio frequency signal segmentation unit, configured to respond to a radio frequency signal of a radio frequency ablation device acquired by an EMC-EMI sensor, segment the radio frequency signal, where a window stage after segmentation includes one or more stages of idling, energy generation, ablation and cutting, and coagulation and heat control, and preprocess signals of each window stage after segmentation respectively;

a Hilbert-Huang transformation unit, configured to perform Hilbert-Huang transform on signals of the two window stages of ablation and cutting, and coagulation and heat control after segmentation, to obtain time-frequency characteristics of electromagnetic signals of the corresponding window stages;

a threshold comparison unit, configured to calculate EMC power, EMI radio frequency energy and mode, and a radio frequency signal-to-noise mode according to the time-frequency characteristics of electromagnetic signals; and compare the EMC power, the EMI radio frequency energy and mode, and the radio frequency signal-to-noise mode with corresponding thresholds respectively, to obtain knife head states in the window stages of ablation and cutting, and coagulation and heat control, including touching metal short circuit, overheating and overload; and an output unit, configured to adjust energy parameters of the radio frequency ablation device according to the knife head states, or prompt a user to adjust the energy parameters of the radio frequency ablation device.

Beneficial Effects of the Present Invention

According to the method and device of the present invention, the signal can be effectively segmented, the time-frequency characteristics of electromagnetic signals can be accurately recognized, information such as the EMC power, EMI radio frequency energy and mode, and radio frequency signal-to-noise mode can be obtained, and an actual situation of the radio frequency ablation device in each window state can be obtained. According to the actual situation of the device, parameters such as related current and voltage adapted to output are matched, and the user is prompted to implement accurate and safe energy control. In a case that the radio frequency is relatively low, nerves pull muscles due to the stress reaction, resulting in muscular tissue shaking, causing risk in surgery, which is more obvious especially in deep cutting of deep muscles below 9 cm, and about 100 kHz. Through adaptive energy control, the radio frequency is increased to 350 kHz or more, which can effectively reduce neuromuscular shaking by more than 98%, and further reduce the risk in surgery.

Other features and advantages of the present invention are described in detail in the subsequent specific implementations.

BRIEF DESCRIPTION OF THE DRAWINGS

The foregoing and other objectives, features and advantages of the present invention are more obvious through a more detailed description of exemplary implementations of the present invention with reference to the accompanying drawings. In the exemplary implementations of the present invention, the same reference numerals generally refer to the same parts.

DETAILED DESCRIPTION OF THE EMBODIMENTS

Figure 1:
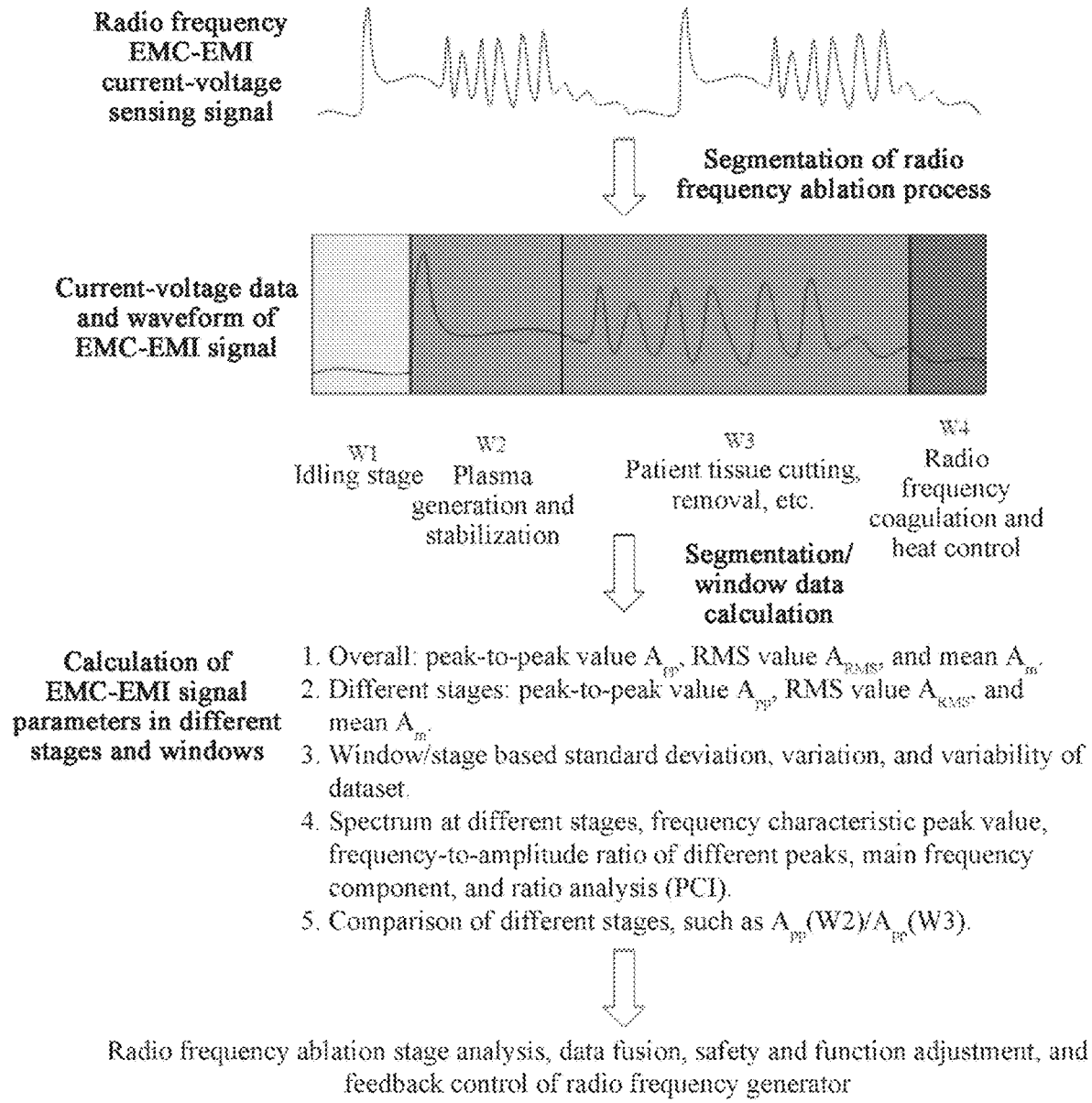
FIG. 1 is a flow chart of data processing according to the present invention.

The following describes in detail exemplary implementations of the present invention with reference to the accompanying drawings. Although the accompanying drawings show the exemplary implementations of the present invention, it should be understood that the present invention may be implemented in various manners and should not be limited by the implementations described herein.

The present invention provides a method of adaptive EMC-EMI radio frequency signal data processing. The method includes the following steps:

S1. A processor responds to a radio frequency signal of a radio frequency ablation device acquired by an EMC-EMI sensor, including: voltage, current, impedance, temperature, humidity, and contact force.

S2. The processor segments the radio frequency signal, where a window stage after segmentation includes one or more stages of idling, energy generation, ablation and cutting, and coagulation and heat control, and preprocesses signals of each window stage after segmentation respectively. The preprocessing includes: removing high-frequency electrical noise by low-pass filtering; eliminating signal drift by high-pass filtering; and removing a non-physiological pseudo-signal by band-pass filtering.

S3. Perform Hilbert-Huang transform on signals of the two window stages of ablation and cutting, and coagulation and heat control after segmentation, to obtain time-frequency characteristics of electromagnetic signals of the corresponding window stages.

S4. Calculate EMC power, EMI radio frequency energy and mode, and a radio frequency signal-to-noise mode according to the time-frequency characteristics of electromagnetic signals; and compare the EMC power, the EMI radio frequency energy and mode, and the radio frequency signal-to-noise mode with corresponding thresholds respectively, to obtain knife head states in the window stages of ablation and cutting, and coagulation and heat control, including touching metal short circuit, overheating and overload.

S5. The processor adjusts energy parameters of the radio frequency ablation device according to the knife head states obtained in step S4, or prompts a user to adjust the energy parameters of the radio frequency ablation device.

In this embodiment, according to the method and device of the present invention, the signal can be effectively segmented, the time-frequency characteristics of electromagnetic signals can be accurately recognized, information such as the EMC power, EMI radio frequency energy and mode, and radio frequency signal-to-noise mode can be obtained, and an actual situation of the radio frequency ablation device in each window state can be obtained. According to the actual situation of the device, parameters such as related current and voltage adapted to output are matched, and the user is prompted to implement accurate and safe energy control.

Further, the Hilbert-Huang transform specifically includes the following steps:

S3.1. Perform empirical mode decomposition (EMD) on the signals of the window stages of ablation and cutting, and coagulation and heat control respectively, to obtain limited intrinsic mode function (IMF) component expressions of a corresponding signal s(t).

$$s(t)=\Sigma_{i=1}^{k}c_i(t)+r_k(t),$$

where i represents a number of an IMF component order, k represents the IMF component order, $c_i(t)$ is an $i^{th}$ order of IMF component, and $r_k(t)$ is an $i^{th}$ order of IMF residual component. The obtaining limited intrinsic mode function (IMF) components of a signal s(t) specifically includes the following steps:

S3.1.1. Segment an original signal s(t) according to a preset processing window, and take a maximum value and a minimum value of the original signal s(t) for any processing window;

S3.1.2. Interpolate the maximum value and the minimum value of the original signal s(t) in the processing window by using spline interpolation, and fit upper and lower envelopes.

S3.1.3. Calculate a mean $m_1(t)$ of the upper and lower envelopes, and obtain a difference $h_1(t)$ between the original signal s(t) and the mean $m_1(t)$; $h_1(t)=s(t)-m_1(t)$;

S3.1.4. Calculate the first IMF component $c_1(t)$ and a residual signal $r_1(t)$;

$$c_1(t)=h_1(t),\ r_1(t)=s(t)-c_1(t);$$

S3.1.5. Determine whether the residual signal $r_1(t)$ meets an empirical mode decomposition (EMD) condition, that is, whether $r_1(t)$ is a monotone function, if the residual signal $r_1(t)$ meets the condition, stop processing, and mark k=1;

otherwise, repeat steps S3.1.1 to S3.1.4 for k times by using $h_1(t)$ as the original signal;

$$h_k(t)=h_{(k-1)}(t)-m_k(t),\ c_k(t)=h_k(t),\ r_k(t)=h_{(k-1)}(t)-c_k(t);$$

complete smooth decomposition processing, and record k until the residual signal $r_k(t)$ is the monotone function.

S3.1.6. Convert s(t) into k intrinsic mode function component expressions:

s(t)=$\Sigma_{i=1}^{k}c_i(t)+r_k(t)$, where $c_i(t)$ is an $i^{th}$ IMF component of the signal.

S3.2. Perform Hilbert transform on each order of IMF component $c_i(t)$, to obtain a Hilbert transform expression of the IMF component $y_i(t)$;

$$y_i(t) = \frac{p}{\pi}\int_{-\infty}^{+\infty}\frac{c_i(t)}{t-\tau}d\tau$$

where p is a Cauchy principal value, and τ represents an amount of change per unit time;

S3.3. Obtain an instantaneous phase $\varphi_i(t)$ and an instantaneous frequency $\omega_i(t)$ of each order of IMF component by using the following formula;

$$\varphi_i(t) = \arctan(y_i(t)/c_i(t))$$

$$\omega_i(t) = \frac{d\varphi_i(t)}{dt}.$$

S3.4. Compare and screen a value of each frequency point in the instantaneous frequency $\omega_i(t)$ with an instantaneous frequency threshold $\lambda$, if the instantaneous frequency $|\omega_i|>\lambda$, keep the IMFi component unchanged, otherwise make the IMFi component be 0, where the instantaneous frequency threshold $\lambda$ ranges from 0.0094 to 0.01;

S3.5. Distinguish between a square wave and a harmonic wave according to the value of each frequency point, and record a spectrum and spectrum characteristics of the IMFi component, where the spectrum characteristics include: a frequency characteristic peak value, a peak-to-peak frequency-to-amplitude ratio, and a main frequency component.

S3.6. Reconstruct a signal s'(t) by using a screened IMF component in step S3.4, to obtain a time-frequency characteristic of an electromagnetic signal of the reconstructed signal.

In this embodiment, according the first part of the Hilbert-Huang transform, a non-linear and non-stationary signal is decomposed into limited intrinsic mode function (IMF) components, and a mean delay on extremums of two ends of the window signal can be used to achieve a constraint on a signal endpoint and reduce a fitting error near the endpoint. According to the second part of the Hilbert-Huang transform, Hilbert spectrum analysis (HHP) is to perform the Hilbert transform on effective IMFi, use threshold determination before the signal is reconstructed, and separate an effective signal and a decomposition error or noise interference. In data analysis of a plasma knife, signal characterization of few effective IMF components such as electromagnetic conduction and electromagnetic interference are centrally examined. Separated noise interference is eliminated, which effectively improves accuracy of data tracking.

A device for the method of adaptive EMC-EMI radio frequency signal data processing. The device includes:

a radio frequency signal segmentation unit, configured to respond to a radio frequency signal of a radio frequency ablation device acquired by an EMC-EMI sensor, segment the radio frequency signal, where a window stage after segmentation includes one or more stages of idling, energy generation, ablation and cutting, and coagulation and heat control, and preprocess signals of each window stage after segmentation respectively;

a Hilbert-Huang transformation unit, configured to perform Hilbert-Huang transform on signals of the two window stages of ablation and cutting, and coagulation and heat control after segmentation, to obtain time-frequency characteristics of electromagnetic signals of the corresponding window stages;

a threshold comparison unit, configured to calculate EMC power, EMI radio frequency energy and mode, and a radio frequency signal-to-noise mode according to the time-frequency characteristics of electromagnetic signals; and compare the EMC power, the EMI radio frequency energy and mode, and the radio frequency signal-to-noise mode with corresponding thresholds respectively, to obtain knife head states in the window stages of ablation and cutting, and coagulation and heat control, including touching metal short circuit, overheating and overload; and an output unit, configured to adjust energy parameters of the radio frequency ablation device according to the knife head states, or prompt a user to adjust the energy parameters of the radio frequency ablation device.

During specific implementation, as shown in FIG. 1, EMC-EMI signal-noise analysis includes segmentation of a signal waveform in the radio frequency stage, calculation of current/voltage/energy windows, calculation of statistical parameters and indicators (mean, STD, variation and variability, spectral ratio, and the like), multi-calculation indicator combination and information fusion, and the like. A radio frequency ablation process can be divided into four stages from W1 to W4: W1 is an idling stage; W2 is a plasma generation and stabilization stage; W3 is a radio frequency ablation and cutting stage; and W4 is a radio frequency coagulation and heat control stage. Various different methods can be used to calculate, estimate and characterize a radio frequency factor, and to evaluate radio frequency transmission efficiency. Different results can be fused together, which facilitates clinical use to obtain better and more accurate clinical diagnosis.

Figure 2:
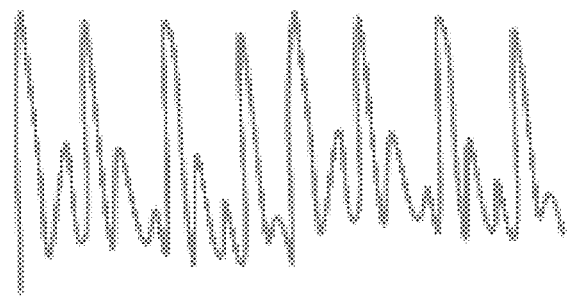
FIG. 2 is a schematic diagram of a waveform comparison between the adaptive method of the present invention when applied and a conventional radio frequency ablation device.
Figure 2:
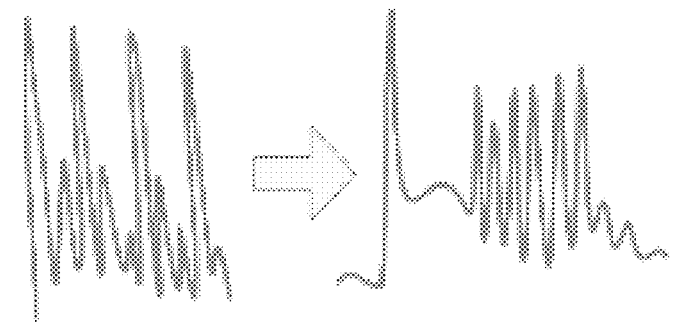

In this embodiment, radio frequency of two different types of radio frequency plasma generation mechanisms are used, which are an adaptive radio frequency ablation surgery system and a commonly used radio frequency ablation device. The adaptive radio frequency ablation surgery system uses an adaptive radio frequency plasma generation mechanism based on closed-loop feedback control of wireless EMC-EMI signal acquisition and calculation. The commonly used radio frequency ablation device uses a radio frequency plasma generation mechanism with preset voltage set value and energy level. Comparison is made by monitoring plasma generation and stabilization stages (W2) of the two. As shown in FIG. 2, the upper part in the figure is a conventional radio frequency ablation device; and the lower part in the figure is an adaptive radio frequency ablation surgery system.

In this embodiment, both radio frequency ablation generators have the same initial radio frequency level set value of 4. After enabled, the commonly used radio frequency ablation device generates a stable 190 V RMS voltage and there are some flashing plasma flames at a plasma knife head in normal saline, which means that when the radio frequency level set value is 4, no sufficient voltage can be transmitted to stably generate the plasma. The adaptive radio frequency ablation surgery system is equipped with a wireless EMC-EMI sensor, converter, calculator, and communication module. An initial phenomenon of the adaptive radio frequency ablation surgery system is similar to that of the commonly used radio frequency ablation device. However, after the radio frequency is activated for twice to three times, plasma of the plasma knife head becomes stable and efficient, and provides feedback control to the clinical user, to increase to 230 V RMS voltage. By monitoring a mode of flashing and ignition of the plasma knife head in the W2 stage, the wireless EMC-EMI module can evaluate and calculate a minimum RMS voltage required to generate stable radio frequency plasma in a particular normal saline environment or clinical situation. From radio frequency output voltage monitoring, it can be seen that an adaptive plasma radio frequency ablation system has a rapid response and adjustment capability for generation and stabilization of the radio frequency plasma.

In a case that the radio frequency is relatively low, nerves pull muscles due to the stress reaction, resulting in muscular tissue shaking, causing risk in surgery, which is more obvious especially in deep cutting of deep muscles below 9 cm, and about 100 kHz. Through adaptive energy control, the radio frequency is increased to 350 kHz or more, which can effectively reduce neuromuscular shaking by more than 98%, and further reduce the risk in surgery.

This embodiment merely shows that EMC-EMI signal-noise is used to track/monitor/control voltage transmission stably generated by the plasma. In an actual application, data and waveform of the EMC-EMI signal-noise can provide more detailed information in radio frequency ablation, such as current limitation, ablation duration, and coagulation depth control, and even can predict optimal and minimal energy transmission required for an organ tissues.

The embodiments of the present invention are described above, and the foregoing descriptions are exemplary but not exhaustive and are not limited to the disclosed embodiments. Without departing from the scope and spirit of the described embodiments, many modifications and variations are apparent to a person of ordinary skill in the technical field.

What is claimed is:

1. A method of an adaptive EMC-EMI radio frequency signal data processing, comprising the following steps:
    S1: responding to, by a processor, a radio frequency signal of a radio frequency ablation device acquired by an EMC-EMI sensor;
    S2: segmenting, by the processor, the radio frequency signal, wherein a window stage after a segmentation comprises at least one stage of an idling, an energy generation, an ablation and a cutting, and a coagulation and a heat control, and
    preprocessing signals of each window stage after the segmentation respectively;
    S3: performing a Hilbert-Huang transform on signals of two window stages of the ablation and the cutting, and the coagulation and the heat control after the segmentation, to obtain time-frequency characteristics of electromagnetic signals of corresponding window stages;
    S4: calculating an EMC power, an EMI radio frequency energy and mode, and a radio frequency signal-to-noise mode according to the time-frequency characteristics of the electromagnetic signals; and comparing the EMC power, the EMI radio frequency energy and mode, and the radio frequency signal-to-noise mode with corresponding thresholds respectively, to obtain knife head states in the two window stages of the ablation and the cutting, and the coagulation and the heat control, wherein the knife head states comprise a touching metal short circuit, an overheating, and an overload; and
    S5: adjusting, by the processor, energy parameters of the radio frequency ablation device according to the knife head states obtained in step S4, or prompting a user to adjust the energy parameters of the radio frequency ablation device.

2. The method of the adaptive EMC-EMI radio frequency signal data processing according to claim 1, wherein the preprocessing in step S2 comprises:
    step 2.1: removing a high-frequency electrical noise by a low-pass filtering;
    step 2.2: eliminating a signal drift by a high-pass filtering; and
    step 2.3: removing a non-physiological pseudo-signal by a band-pass filtering.

3. The method of the adaptive EMC-EMI radio frequency signal data processing according to claim 1, wherein the Hilbert-Huang transform in step S3 comprises the following steps:
    S3.1: performing an empirical mode decomposition (EMD) on the signals of the two window stages of the ablation and the cutting, and the coagulation and the heat control respectively, to obtain limited intrinsic mode function (IMF) component expressions of a corresponding signal s(t);

$$s(t) = \sum_{i=1}^{k} c_i(t) + r_k(t),$$

wherein i represents a number of an IMF component order, k represents the IMF component order, $c_i(t)$ is an $i^{th}$ order of an IMF component, and $r_k(t)$ is an $i^{th}$ order of an IMF residual component;
    S3.2: performing a Hilbert transform on each order of the IMF component $c_i(t)$, to obtain a Hilbert transform expression $y_i(t)$ of the IMF component;

$$y_i(t) = \frac{p}{\pi} \int_{-\infty}^{+\infty} \frac{c_i(t)}{t - \tau} d\tau$$

wherein p is a Cauchy principal value, and $\tau$ represents an amount of change per unit time;
    S3.3: obtaining an instantaneous phase $\varphi_i(t)$ and an instantaneous frequency $\omega_i(t)$ of each order of the IMF component by using the following formula;

$$\varphi_i(t) = \arctan(y_i(t)/c_i(t))$$
    $$\omega_i(t) = \frac{d\varphi_i(t)}{dt};$$

S3.4: comparing and screening a value of each frequency point in the instantaneous frequency $\omega_i(t)$ with an instantaneous frequency threshold $\lambda$, if the instantaneous frequency $|\omega_i| > \lambda$, keeping the IMFi component unchanged, otherwise making the IMFi component be 0;
    S3.5: distinguishing between a square wave and a harmonic wave according to the value of each frequency point, and recording a spectrum and spectrum characteristics of the IMFi component; and
    S3.6: reconstructing a signal s'(t) by using a screened IMF component in step S3.4, to obtain a time-frequency characteristic of an electromagnetic signal of a reconstructed signal.

4. The method of the adaptive EMC-EMI radio frequency signal data processing according to claim 3, wherein the obtaining limited intrinsic mode function (IMF) components of the signal s(t) in step S3.1 comprises the following steps:
    S3.1.1: segmenting an original signal s(t) according to a preset processing window, and taking a maximum value and a minimum value of the original signal s(t) for any processing window;
    S3.1.2: interpolating the maximum value and the minimum value of the original signal s(t) in the processing window by using a spline interpolation, and fitting upper and lower envelopes;
    S3.1.3: calculating a mean $m_1(t)$ of the upper and lower envelopes, and obtaining a difference $h_1(t)$ between the original signal s(t) and the mean $m_1(t)$, wherein $h_1(t) = s(t) - m_1(t)$;

S3.1.4: calculating a first IMF component $c_1(t)$ and a residual signal $r_1(t)$;

$$c_1(t)=h_1(t), r_1(t)=s(t)-c_1(t);$$

S3.1.5: determining whether the residual signal $r_1(t)$ meets an empirical mode decomposition (EMD) condition, that is, whether $r_1(t)$ is a monotone function, if the residual signal $r_1(t)$ meets the EMD condition, stopping processing, and marking k=1;
otherwise, repeating steps S3.1.1 to S3.1.4 fork times by using $h_1(t)$ as the original signal;

$$h_k(t)=h_{(k-1)}(t)-m_k(t), c_k(t)=h_k(t), r_k(t)=h_{(k-1)}(t)-c_k(t);$$

completing a smooth decomposition processing, and recording k until the residual signal $r_k(t)$ is the monotone function; and S3.1.6: converting s(t) into k intrinsic mode function component expressions:
$s(t)=\Sigma_{i=1}^{k}c_i(t)+r_k(t)$, wherein $c_i(t)$ is an $i^{th}$ IMF component of the signal.

5. The method of the adaptive EMC-EMI radio frequency signal data processing according to claim 3, wherein the instantaneous frequency threshold $\lambda$ in step S3.4 ranges from 0.0094 to 0.01.

6. The method of the adaptive EMC-EMI radio frequency signal data processing according to claim 3, wherein the spectrum characteristics in step S3.5 comprise: a frequency characteristic peak value, a peak-to-peak frequency-to-amplitude ratio, and a main frequency component.

7. The method of the adaptive EMC-EMI radio frequency signal data processing according to claim 1, wherein the energy parameters of the radio frequency ablation device in step S5 comprise: a voltage, a current, an impedance, a temperature, a humidity, and a contact force.

8. A device for the method of the adaptive EMC-EMI radio frequency signal data processing according to claim 1, comprising:
a radio frequency signal segmentation unit, configured to respond to the radio frequency signal of the radio frequency ablation device acquired by the EMC-EMI sensor, segment the radio frequency signal, wherein the window stage after the segmentation comprises the at least one stage of the idling, the energy generation, the ablation and the cutting, and the coagulation and the heat control, and preprocess the signals of each window stage after the segmentation respectively;
a Hilbert-Huang transformation unit, configured to perform the Hilbert-Huang transform on the signals of the two window stages of the ablation and the cutting, and the coagulation and the heat control after the segmentation, to obtain the time-frequency characteristics of the electromagnetic signals of the corresponding window stages;
a threshold comparison unit, configured to calculate the EMC power, the EMI radio frequency energy and mode, and the radio frequency signal-to-noise mode according to the time-frequency characteristics of the electromagnetic signals; and compare the EMC power, the EMI radio frequency energy and mode, and the radio frequency signal-to-noise mode with the corresponding thresholds respectively, to obtain the knife head states in the two window stages of the ablation and the cutting, and the coagulation and the heat control, wherein the knife head states comprise the touching metal short circuit, the overheating, and the overload; and an output unit, configured to adjust the energy parameters of the radio frequency ablation device according to the knife head states, or prompt the user to adjust the energy parameters of the radio frequency ablation device.

9. The device for the method of the adaptive EMC-EMI radio frequency signal data processing according to claim 8, wherein the preprocessing in step S2 comprises:
step 2.1: removing a high-frequency electrical noise by a low-pass filtering;
step 2.2: eliminating a signal drift by a high-pass filtering; and
step 2.3: removing a non-physiological pseudo-signal by a band-pass filtering.

10. The device for the method of the adaptive EMC-EMI radio frequency signal data processing according to claim 8, wherein the Hilbert-Huang transform in step S3 comprises the following steps:
S3.1: performing an empirical mode decomposition (EMD) on the signals of the two window stages of the ablation and the cutting, and the coagulation and the heat control respectively, to obtain limited intrinsic mode function (IMF) component expressions of a corresponding signal s(t);

$$s(t)=\Sigma_{i=1}^{k}c_i(t)+r_k(t),$$

wherein I represents a number of an IMF component order, k represents the IMF component order, $c_i(t)$ is an $i^{th}$ order of an IMF component, and $r_k(t)$ is an $i^{th}$ order of an IMF residual component;
S3.2: performing a Hilbert transform on each order of the IMF component $c_i(t)$, to obtain a Hilbert transform expression $y_i(t)$ of the IMF component;

$$y_i(t) = \frac{p}{\pi}\int_{-\infty}^{+\infty}\frac{c_i(t)}{t-\tau}d\tau$$

wherein p is a Cauchy principal value, and $\tau$ represents an amount of change per unit time;
S3.3: obtaining an instantaneous phase $\varphi_i(t)$ and an instantaneous frequency $\omega_i(t)$ of each order of the IMF component by using the following formula;

$$\varphi_i(t) = \arctan(y_i(t)/c_i(t))$$

$$\omega_i(t) = \frac{d\varphi_i(t)}{dt};$$

S3.4: comparing and screening a value of each frequency point in the instantaneous frequency $\omega_i(t)$ with an instantaneous frequency threshold), $\lambda$, if the instantaneous frequency $|\omega_i|>\lambda$, keeping the IMFi component unchanged, otherwise making the IMFi component be 0;
S3.5: distinguishing between a square wave and a harmonic wave according to the value of each frequency point, and recording a spectrum and spectrum characteristics of the IMFi component; and
S3.6: reconstructing a signal s'(t) by using a screened IMF component in step S3.4, to obtain a time-frequency characteristic of an electromagnetic signal of a reconstructed signal.

11. The device for the method of the adaptive EMC-EMI radio frequency signal data processing according to claim 10, wherein the obtaining limited intrinsic mode function (IMF) components of the signal s(t) in step S3.1 comprises the following steps:

S3.1.1: segmenting an original signal s(t) according to a preset processing window, and taking a maximum value and a minimum value of the original signal s(t) for any processing window;

S3.1.2: interpolating the maximum value and the minimum value of the original signal s(t) in the processing window by using a spline interpolation, and fitting upper and lower envelopes;

S3.1.3: calculating a mean $m_1(t)$ of the upper and lower envelopes, and obtaining a difference $h_1(t)$ between the original signal s(t) and the mean $m_1(t)$, wherein $h_1(t)=s(t)-m_1(t)$;

S3.1.4: calculating a first IMF component $c_1(t)$ and a residual signal $r_1(t)$;

$c_1(t)=h_1(t), r_1(t)=s(t)-c_1(t)$;

S3.1.5: determining whether the residual signal $r_1(t)$ meets an empirical mode decomposition (EMD) condition, that is, whether $r_1(t)$ is a monotone function, if the residual signal $r_1(t)$ meets the EMD condition, stopping processing, and marking k=1;

otherwise, repeating steps S3.1.1 to S3.1.4 fork times by using $h_1(t)$ as the original signal;

$h_k(t)=h_{(k-1)}(t)-m_k(t), c_k(t)=h_k(t), r_k(t)=h_{(k-1)}(t)-c_k(t)$;

completing a smooth decomposition processing, and recording k until the residual signal $r_k(t)$ is the monotone function; and S3.1.6: converting s(t) into k intrinsic mode function component expressions:

$s(t)=\Sigma_{i=1}^{k}c_i(t) r_k(t)$, wherein $c_i(t)$ is an $i^{th}$ IMF component of the signal.

12. The device for the method of the adaptive EMC-EMI radio frequency signal data processing according to claim 10, wherein the instantaneous frequency threshold λ in step S3.4 ranges from 0.0094 to 0.01.

13. The device for the method of the adaptive EMC-EMI radio frequency signal data processing according to claim 10, wherein the spectrum characteristics in step S3.5 comprise: a frequency characteristic peak value, a peak-to-peak frequency-to-amplitude ratio, and a main frequency component.

14. The device for the method of the adaptive EMC-EMI radio frequency signal data processing according to claim 8, wherein the energy parameters of the radio frequency ablation device in step S5 comprise: a voltage, a current, an impedance, a temperature, a humidity, and a contact force.

* * * * *